L. H. FRANKLIN.

Pendulum Scales.

No. 66,825.

Patented July 16, 1867.

WITNESSES:
Abr F. Roberts
Theo Tusche

INVENTOR:
L. H. Franklin
per Munn & Co
Attorneys

United States Patent Office.

L. H. FRANKLIN, OF POLAND, NEW YORK.

Letters Patent No. 66,825, dated July 16, 1867.

WEIGHING-SCALES.

The Schedule referred to in these Letters Patent and making part of the same.

TO ALL WHOM IT MAY CONCERN:

Be it known that I, L. H. FRANKLIN, of Poland, in the county of Herkimer, and State of New York, have invented a new and useful Improvement in Weighing-Scales; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

This invention relates to an improvement in weighing-scales of the steelyard class, and consists in enclosing in a swinging shell or case a lever, that is pivoted at one end, and at the other end is connected by a metal strap with an eccentric, forming part of a weighted pendulum or lever that carries a pointer to indicate by indices on the outside of the case the weight of an article suspended at some one or more fixed points on the pivoted lever.

Figure 1:
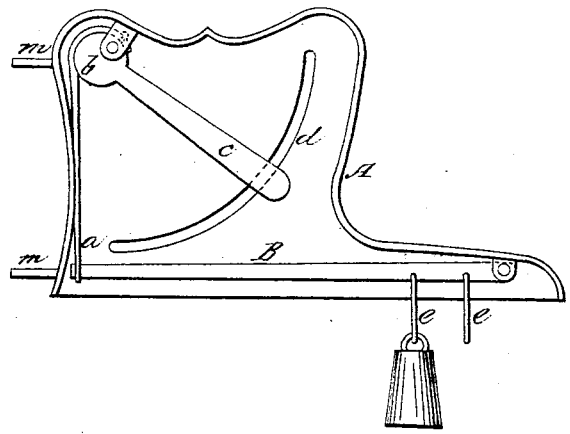
Figure 1 is a side view with one of the sides of the shell of the scale removed.
Figure 2:
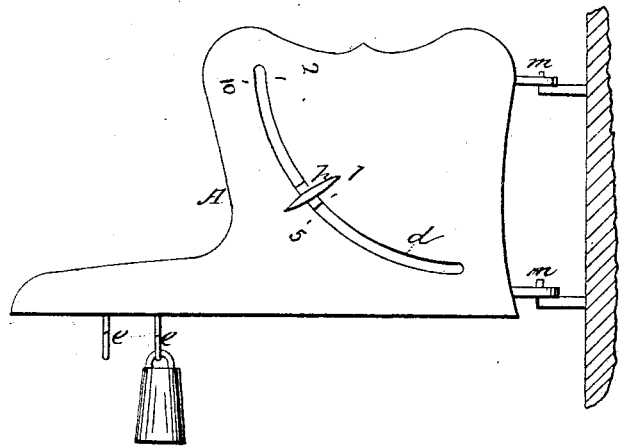
Figure 2 is an outside view showing the index and pointer.

A represents a flat metallic shell or case, that is hung by hinges $m$ $m$ on the wall, or at the side of a post or other object, so that it can swing out of the way, as shown in fig. 2. B is a long lever enclosed in the case A, at the bottom, and pivoted at one end so as to vibrate vertically at the other end, which is connected with a metal strap, $a$, that passes up inside the case to an eccentric, $b$, to which it is attached in such manner as to move a weighted lever or pendulum, $c$, projecting from the eccentric to a segmental slot, $d$, in one side of the case A. A pointer, $h$, is fixed on the end of the pendulum $c$, to work in the slot $d$ and point on the outside of the case, on both its sides, to graduated scales or indexes of weights, corresponding with the weight of articles hung to the hooks $e$ $e$ on the lever B, as shown in the drawings in red lines. The index on one side of the slat gives the weight of light, and the index on the other side the weight of heavier articles attached to one or the other of the respective hooks $e$ $e$.

Having thus described my invention, what I claim as new, and desire to secure by Letters Patent, is—

The swing-case A with the indexes, in combination with the eccentric $b$, the strap $a$, and the lever B, arranged and operating for weighing, substantially as herein described.

L. H. FRANKLIN.

Witnesses:
  E. R. READ,
  WHEELER CASE.